Patented Dec. 14, 1948

2,456,271

UNITED STATES PATENT OFFICE 2,456,271

REACTION PRODUCT OF N-SUBSTITUTED POLYAMIDES WITH HYDROXYLATED MATERIALS AND PROCESS FOR OBTAINING SAME

Boynton Graham, Wilmington, Del., assignor to E. I. du Pont de Nemours & Company, Wilmington, Del., a corporation of Delaware No Drawing. Application April 6, 1944, Serial No. 529,815

6 Claims. (Cl. 260—72)

This invention relates to organic chemical compositions and more particularly to polymeric compositions having improved properties.

This invention has as an object the preparation of new polymeric materials. A further object is the preparation of polymers useful in the manufacture of films, fibers, coatings, molded objects, etc., which have improved properties such as increased insolubility in water and organic solvents and increased molecular weight. Other objects will appear from the description given hereinafter.

These objects are accomplished by the methods more particularly described hereinafter through the reaction of an N-alkoxymethyl polyamide with another material which contains a plurality of alcoholic hydroxyl groups.

By N-alkoxymethyl polyamides are meant polyamides which have a recurring

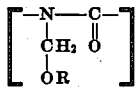

linkage where the R is an organic radical. These modified polyamides may be prepared from synthetic linear polyamides having a molecular weight of above 3000 and which synthetic linear polyamides have substantial amounts of hydrogen bearing carbonamide groups.

Linear polyamides used in the preparation of the N-alkoxymethyl polyamides are of the general type described in U. S. Patents 2,071,250 and 2,071,253 and 2,130,948. These polyamides in general comprise the reaction products of linear polymer-forming compositions containing amide-forming groups, e. g., difunctional molecules each of which contains two reactive amide-forming groups which are complementary to reactive amide-forming groups in other molecules. Such polyamides can be prepared by various methods, for example, by self polymerization of a monoaminomonocarboxylic acid, by reacting a diamine with a dibasic carboxylic acid in substantially equal molecular amounts or by reacting a monoaminomonohydric alcohol with a dibasic carboxylic acid in substantially equal molecular amounts. It is to be understood that reference herein to the amino acids, diamines, dibasic carboxylic acids and amino alcohols is intended to include the equivalent amide-forming derivatives of these reactants. The average number of carbon atoms separating the amide groups in these reactants is at least two. Linear polyamides also include polyester-amides such as, for example, those obtained by admixture with other linear polymer-forming reactants, such as, glycol-dibasic acid mixtures or mixtures of hydroxy acids with the above mentioned polyamide-forming reactants.

Such synthetic linear polyamides can be converted to the N-alkoxymethyl derivatives employed in the process of the present invention, e. g., to those compounds having the previously mentioned linkages or groups by treatment of the polyamide having hydrogen bearing carbonamide groups

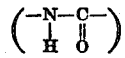

with formaldehyde and an alcohol in the presence of a catalyst such as phosphoric acid, hydroxyacetic, maleic, oxalic, benzoic, p-toluene sulfonic acid, etc.

One procedure for preparing these N-alkoxymethyl polyamides consists in treating a synthetic polyamide of the kind previously described with an alcohol, such as methyl alcohol, ethyl alcohol, butyl alcohol, etc., and formaldehyde in the presence of a small amount (usually 0.5-5%) of phosphoric or a similar acid at a temperature of preferably between 80° and 150° C. The reaction is in general carried out in a sealed vessel. It is preferred that the catalyst be injected into the reaction mixture of the polyamide, alcohol and formaldehyde or formaldehyde liberating material, after the reaction mixture has been heated to the desired temperature for the reaction. The reaction usually requires 10-20 minutes under such conditions and the N-alkoxymethyl polyamide is isolated by pouring the reaction mixture into a water or a weakly basic aqueous solution. The vigorous stirring during this operation (in which the acid catalyst is neutralized) usually results in the separation of solid particles of the N-alkoxymethyl polyamide.

The reaction of these N-alkoxymethyl polyamides with an organic compound containing at least 2 alcoholic hydroxyl groups can take place under various conditions. The following examples give the more detailed practice of this invention for specific cases. In the following examples the parts given are parts by weight.

Example I

A solution was prepared which contained the folowing: 1 part of a nitrocellulose having nitrogen content of approximately 12.0%.

5 parts of a butanol solution containing 30% of an N - butoxymethyl polyhexamethylene adipamide polyhexamethylene sebacamide interpolymer (30/70 and having 60% carbonamide substitution).

8.5 parts of alcohol-ethyl acetate mixture.

A portion of the above solution was spread on a glass plate and after air drying for about 16 hours, the resulting film was baked in an oven at 130° C. for ½ hour. This film was insoluble in organic solvents, flexible and moderately tough and pliable. A film of the nitrocellulose when treated in the manner described except that no substitued polyamide was added was found to be very brittle and soluble in organic solvents. A film of the above modified polyamide prepared in the absence of the nitrocellulose was also more soluble and softer than the modified film.

The insolubilization of the nitrocellulose with N-alkoxymethyl polyamide may be effected at lower temperatures such as room temperature, e. g., 20° C. or above, by the addition of small amounts of acid catalysts such as an organic sulfonic acid or aluminum chloride. Solutions of such a composition may be used in the preparation of coating for keratinous material, for example (with added dyes or pigments) to form a finger nail polish.

The nitrocellulose employed in the above example has a hydroxyl content of approximately 0.66 alcoholic hydroxyl groups per glucose unit of the cellulose.

*Example II*

A cotton fabric was coated with a nitrocellulose solution and after evaporation of the solvent, an N-ethoxymethyl polyamide was applied from solution to give a top coating. After baking at a temperature of approximately 105° C for 24 hours, the coated fabric became much stiffer and was more resistant to the solvent action and penetration of organic solvents than coatings of essentially the same thickness of either nitrocellulose or the N-ethoxymethyl polyamide, as well as nitrocellulose with the N-alkoxymethyl polyamide as a top coating but which combination had not been subjected to the baking treatment.

*Example III*

A solution consisting of 1125 parts of cellulose acetate (54.5% combined acetic acid or having approximately 0.62 hydroxyls per glucose unit of the cellulose) in 3375 parts of an acetone-methanol mixture was thoroughly mixed with a solution of 125 parts of N-methoxymethyl polyhexamethylene adipamide in 275 parts of methanol. The mixed solution was filtered and a 104 denier 40 filament yarn was prepared by extrusion of this solution at approximately 300-350 pounds pressure through a spinneret into a heated air atmosphere. The resulting yarn was soaked in a bath buffered to a pH of 4 for 3 hours, dried and heat treated in an oven at 160° C. for 90 minutes. The resulting yarn had the following properties: dry tenacity, 1.23 grams/denier; wet tenacity, .081 g./d.; knot tenacity, 1.19 g./d.; elongation of approximately 17 to 23% both wet and dry with 76% recovery. The yarn was insoluble in acetone and resistant to the action of other organic solvents while the unmodified cellulose acetate yarn is soluble in such solvents.

*Example IV*

When a solution of cellulose acetate containing 10% by weight based on the cellulose acetate of an N-methoxymethyl polyhexamethylene adipamide was flowed onto a glass plate there was obtained after evaporation a clear film (The above solution was prepared essentially in the manner described in Example III.) The film obtained after evaporation of the solvent possessed a flexibility value of 58 as compared to a value of 25 for the unmodified cellulose acetate. The flexibility value was determined as the number of times a strip of film could be folded in alternate directions until it broke. Baking of this modified film for approximately 1¾ hours at 160° C. resulted in an increase in flexibility value to 67. The unmodified film showed no improvement in flexibility when subjected to such a heat treatment. The modified film became insoluble in acetone and similar solvents upon baking, while the unmodified film underwent no change in solubility characteristics.

*Example V*

A solution of N-methoxymethyl polyhexamethylene adipamide was prepared in 80% aqueous methanol. There was added to this solution 1% of maleic acid (based on the amount of polyamide). The solution was coated on a 1.32-53" high count sateen fabric. The coating obtained by calendering at 54° C. or by flowing a solution on the fabric was subjected to baking at 100° C. for periods of 5-30 minutes. The coated fabric exhibited high flex durability and was extremely pliable; baking for longer periods of time increased the stiffness of the fabric.

Coated hydroxyl containing fabrics obtained in the general manner described above are superior in properties to fabrics coated with polyamides which have no N-alkoxymethyl substituents. For example, the N-alkoxymethyl substituted polyamide when employed in coating such fabric generally gives rise to a 3 fold increase in flex durability as compared to that of the unsubstituted synthetic linear polyamide coated fabric.

*Example VI*

A solution of 35% concentration was prepared by dissolving an N-methoxymethyl polyhexamethylene adipamide (having about 48% of the carbonamide hydrogens substituted by methoxymethyl groups) in 70% aqueous alcohol. To the resulting solution there was then added 1%, based on the weight of the polyamide, of maleic acid. After thorough mixing, the solution was applied to the 4 contact surfaces of 3 plies of 1/16" birch veneer at a rate of about 15 pounds of solid per 1000 sq. ft. of glue line. The coated plies were allowed to dry at room temperature for approximately 15 hours to permit evaporation of the solvent. The 3 plies were placed together with the grain of the center ply at right angles to that of the outer plies and pressed at a pressure of 200 lbs./sq. in. for 20 minutes at 120° C. The panels were removed from the press while hot and after a day the plywood was found to have a dry shear strength of 790 lbs./sq. in. with 100% wood failure. After immersion in boiling water for 3 hours it had a shear strength of 525 lbs./sq. in. with 100% wood failure.

When an N-alkoxymethyl polyamide is employed in the bonding of wood in the absence of substantial amounts of an acid catalyst, the time and/or temperature for the bonding is increased. For example, temperatures of 160° C. for a period of approximately 1 hour may be required to give good bond strengths in the resulting plywood.

The bond strengths and other properties of plywood and other laminated articles composed of cellulosic material bonded with N-alkoxymethyl polyamides indicate a reaction with the cellulosic material. The properties in general are higher than those of customary plywood adhesives and such properties indicate that a cross linking reaction occurs between the N-alkoxy-methyl polyamide and the cellulosic material.

Example VII

Ten parts of an N-methoxymethyl polyhexamethylene adipamide was dissolved in a mixture of 63 parts of alcohol and 27 parts of water. To this solution, there was added 0.1 part of maleic acid and 40 parts of a finely pulverized regenerated cellulose. After thorough mixing the composition was dried in a vacuum desiccator and the cellulose/N - alkoxymethyl polyhexamethylene adipamide composition was compression molded at 180° C. for 10 minutes at 3000 lbs./sq. in. to give a stiff, tough, light brown molding. The molding had a flexural strength of 7980 lbs./sq. in. and an impact strength of 1.32 ft. lbs./in. of notch.

When white pine flour was used in the place of the regenerated cellulose in the above example, the moldings which were obtained had considerably higher flexural strength but were found to have lower impact strengths.

Example VIII

Ten parts of completely hydrolyzed ethylene/vinyl acetate interpolymer having a molar ethylene/vinyl acetate ratio of 2.6/1 was swollen in a benzene-methanol solution. One part of N-methoxymethyl polyhexamethylene adipamide was added to the swollen interpolymer and the composition blended by milling on a rubber mill at 90–100° C. for 15 minutes. Films were prepared by pressing the composition in a hydraulic press at 500 lbs./sq. in. pressure for about 2 minutes at 125–140° C. The films were soaked in a 10% aqueous maleic acid solution for 20 hours and heated in an oven at 100° C. for one hour. The resulting film was insoluble in water and organic solvents. The following table shows the difference in properties of the hydrolyzed ethylene/vinyl acetate interpolymer modified in the manner described.

| | Unmodified | Modified |
|---|---|---|
| Tensile strength, lbs./sq. in | 3,300 | 4,237 |
| Elongation, per cent | 300 | 111 |
| Bending Modulus, lbs./sq. in | 0.13×10⁶ | 0.06×10⁶ |
| Cold Crack Temperature, °C | −47 | −45 |
| Zero Tensile Strength Temperature, °C | 115 | above 300 |

When 5% of the N-alkoxymethyl polyamide was used in the place of the 10% of the above example, the properties of the modified interpolymer were found to be essentially the same as those of the modified material listed in the foregoing table except that the tensile strength of the 5% modified interpolymer was not as high as that of the 10% modified. When no acid catalyst is employed in the curing operation the time required for the insolubilization at temperatures of about 100–115° C. is increased.

Example VIII (A)

A solution consisting of approximately 100 parts of an N-methoxymethyl polyhexamethylene adipamide (having about 50% of the amide groups substituted by methoxymethyl groups), 125 parts of methanol, 30 parts water, 1 part maleic acid and 10 parts of tetraethylene glycol was used for the preparation of yarn by the general procedure described in Example III. The yarn was heated at about 80° C. for a period of between ½ to 1 hour after its preparation. The following table shows the improvement in properties of the glycol-modified N-methoxymethyl polyhexamethylene adipamide yarn as compared to yarn prepared in a similar manner except that no glycol was present:

| | Glycol-Modified | Unmodified |
|---|---|---|
| | Per cent | Per cent |
| Elastic Recovery (room temp.) | 98 | 90 |
| Elastic Recovery (0° C.) | 90 | 50 |
| Elastic Efficiency (work recovery/work input) | 50 | 35 |

The modified yarn was about twice as resistant to degradation by weathering or exposure to ultraviolet light.

Although tetraethylene glycol is preferred in the above procedure, improved properties of N-alkoxymethyl polyamide fibers are obtained when from 3 to 30% (based on the polyamide) of an acyclic aliphatic polyhydroxy compound having not more than 8 carbons and which may have intralinear oxygen atoms in the chain. These compounds include ethylene glycol, di-, tri-, and tetra-ethylene glycol, glycerol, pentaerythritol sorbitol and mannitol.

By "zero tensile strength temperature" is meant the temperature which a film, which is subjected to a slight tension, is broken. The determination may be carried out by exerting a tension of about 12 lbs./sq. in. of cross section on a strip of a thin film while the film is in firm contact with a heated metal cylinder and measuring the temperature at which the film breaks.

Example IX

To a butanol solution containing 4 parts of N-methoxymethyl polyhexamethylene adipamide (having approximately 50% carbonamide substitution), there was added a toluene-propanol solution which contained 0.225 part of a completely hydrolyzed ethylene/vinyl acetate interpolymer of molar ratio of ethylene/vinyl acetate of 2.7/1. The resulting solution was spread on a glass plate and the solvents evaporated by heating for 15 hours at 70° C. The resulting film was baked at 130–140° C. for ½ hour to give a tough, insoluble film having a zero tensile strength temperature of above 250° C. This is higher than the zero tensile strength temperature of an N-methoxymethyl polyhexamethylene adipamide film prepared in essentially the same manner except that no hydroxylated material is present.

Example X

A solution was prepared which consisted of 2 parts of an N-methoxymethyl polyamide (having approximately 50% of the carbonamide hydrogen replaced by N-methoxymethyl group) in 8 parts of butanol. To this was added a solution of 15 parts of alcohol containing 1.5 parts of a polyvinyl butyral having 55% of the hydroxyl groups of corresponding polyvinyl alcohol reacted with butyraldehyde. A portion of the above solution was spread on a glass plate and the resulting film was baked for ½ hour at 100° C. The film obtained was clear and tough. When a solution prepared essentially as described above was cast on a metal plate, for example, a tin or steel plate, and baked at 130° C. for one hour a clear, adherent tough film was formed. This film was substantially insoluble in water and in organic solvents. The exceptional pliability of the film was demonstrated by crimping or bending of the plate which did not cause failure of the film.

Polyvinyl butyral when subjected to the above treatment in the absence of the N-alkoxymethyl polyamide does not undergo any change to a tougher, more insoluble material. The N-methoxymethyl polyamide employed in the above example when subjected to the treatment described above does not undergo complete insolubilization.

*Example XI*

A clear solution of 5 parts of polyvinyl alcohol, 0.5 part of N-methoxymethyl polyhexamethylene adipamide and 0.25 part of ammonium chloride in 70 parts of 50% aqueous alcohol was prepared by heating the mixture with occasional stirring at 90° C. for 40 minutes. The solution was filtered and a film was obtained by the casting of the solution onto a glass plate. After evaporation of the solvent, the film was baked for one hour at 100–105° C. The film was found to have a tensile strength of 540 lbs./sq. in. after soaking in water for 5 minutes. A film of polyvinyl alcohol alone prepared in the absence of the N-alkoxymethyl polyamide has a wet tensile strength of zero under the same conditions.

*Example XII*

To an alcoholic solution containing 24.6 parts of N-methoxymethyl polyhexamethylene adipamide there was added 10.6 parts of glycerol. A clear solution was obtained upon heating and a film was prepared by casting the solution onto a glass plate. After standing at room temperature for about 3 days a clear, smooth and rubbery film was obtained. Baking of a portion of this film at 105° C. for about 24 hours resulted in a clear film from which no glycerol could be extracted by treatment with water whereas glycerol was partially extracted from the corresponding unbaked film. The baked glycerol-modified N-alkoxymethyl polyamide was about ⅓ stiffer and had a lower elongation than the unmodified N-alkoxymethyl polyamide. The tensile strength of the wet film of the baked glycerol-modified N-alkoxymethyl polyamide composition was greater than that of the wet unmodified N-alkoxymethyl polyamide film.

*Example XIII*

A mixture comprising 10 parts of N-methoxymethyl polyhexamethylene adipamide, 1.2 parts of hexamethylene glycol, 2.67 parts of carbon black and a few crystals of oxalic acid was milled on a rubber mill, heated at approximately 80–100° C. for a period of two minutes. The resulting polymeric composition was a tough insoluble material having an increased softening temperature.

*Example XIV*

To an alcoholic solution containing 100 parts of N-methoxymethyl polyhexamethylene adipamide there was added 20 parts of dimethylol urea and 1 part of p-toluene sulfonic acid. A film was cast from the solution and after baking for 5 hours at 100° C. the film was converted to an insoluble composition having a tensile strength of approximately twice that of the original N-alkoxymethyl polyamide. The stiffness of the material was greater than that of the unmodified N-alkoxymethyl polyamide.

This invention is applicable to the reaction of any compound having a plurality of alcoholic hydroxyl groups with any N-alkoxymethyl polyamide. For ease of reaction and for increased modification of the hydroxyl-containing compounds the polyamide should have a substantial number of the —CH$_2$OR groups attached to the carbonamide nitrogen. The OR group is a group in which R is the radical of an alcohol and which may be illustrated by the following specific groups: CH$_3$O—, C$_2$H$_5$O—, C$_3$H$_7$O—, C$_4$H$_9$O—, CH$_3$OCH$_2$O—, C$_2$H$_5$O$_2$CCH$_2$O, C$_6$H$_5$CH$_2$O—, C$_5$H$_{11}$O—, CH$_2$=CHCH$_2$O, C$_{18}$H$_{37}$O—, etc. It is preferred that more than 5% of the nitrogen atoms of the carbonamide groups of the synthetic linear polyamide have the substituents of the general type shown above. When less than approximately 5% of the carbonamide groups are substituted, more of the polyamide may be required for modification of the polyhydroxy compounds and insolubility or crosslinking of the hydroxylated compound may require longer times and higher temperatures than may otherwise be advisable.

Any compound having at least 2 alcoholic hydroxyl groups can be employed for the preparation of these novel polymeric compositions. When other groups such as amino, thiol or sulfonic acids are present in relatively large amounts, it is preferred that a larger amount of the N-alkoxymethyl polyamide be present for the reaction with the alcoholic hydroxyl groups.

By way of illustration of the polyhydroxy compounds useful in this invention, there are included polyhydroxyalkanes, polyhydroxycycloalkanes and polyhydroxyalkenes, such as, ethylene glycol, glycerol, butylene glycol, pentamethylene gycol, hexamethylene glycol, pentaerythritol, sorbitol, mannitol, inositol, 1,4-dihydroxybutene-2, monoglycerides such as the monoglycerides of stearic or palmitic acids, castor oil glycerides, etc. Substituted polyhydroxy compounds that may be mentioned include those otherwise substituted with halogen, nitro, amino, ether, thiol, oxocarbonylic, nitrile and other groups. These include such compounds as monochlorodihydroxy propane, tris(hydroxymethyl) nitromethane, 2-nitro-2-ethyl-1,3-propanediol and the corresponding amines, triethanol amine; hydroxy ethers such as, di-beta-hydroxyethyl ether, diethylene glycol, polyethylene oxides; thiosorbitol; polyhydroxythioethers; carbohydrates such as glyceraldehyde, glucose, etc. (especially the partial acetal or boric acid derivatives of higher sugars), hydroxy acids, for example, tartaric acid and derivatives of acids such as the amide, ester, etc. As shown in the examples, starch, cellulose, cellulose derivatives which still have hydroxyl groups, e. g., cellulose partial ethers, esters, mixed esters, e. g., cellulose glycolate, cellulose aceto-butyrate, etc. and similar material may also be used. Monomeric reaction products of formaldehyde with urea and amides, e. g., dimethylol urea, and bis N-methylol adipamide may also be used. Polymeric hydroxyl containing materials useful in this invention also include hydrolyzed polymers and copolymers of vinyl esters of organic carboxylic acids. These polymers can contain in addition to the hydroxyl groups other groups such as ester or acetal groups. As examples there may be mentioned polyvinyl alcohol, partially acetalized polyvinyl alcohol or partially hydrolyzed polyvinyl esters, hydrolyzed interpolymers of a vinyl ester with a polymerizable compound possessing a single ethylene double bond, such as, for example hydrolyzed vinyl acetate interpolymers with ethylene, vinyl chloride, acrylonitrile, methyl methacrylate, vinylidene chloride, etc.

The amounts by weight of the hydroxylated material and the N-alkoxymethyl polyamide useful in the preparation of the modified compositions of this invention can vary between 1 to 200 and 200 to 1 in parts by weight. As seen from the examples the N-alkoxymethyl polyamide can be insolubilized or converted to derivatives having changed properties by the reaction with small amounts of a polyhydric alcohol. On the other hand, a small amount of the N-alkoxymethyl polyamide when reacted with a polymeric material having a plurality of alcoholic hydroxyl groups brings about such changes in properties as insolubility in water or other solvents, increased toughness and other properties. When quantities less than 0.5% by weight of one of the components is employed as a modifier for the other, the properties of the resulting product may not be substantially different from those of the initial material. In general it is preferred that the amounts present vary from 5 to 95%.

The modification reaction of this invention may be conducted in the presence or absence of solvents or diluents at atmospheric, superatmospheric, or subatmospheric pressures. In some cases the solvent or diluent may be the reactive hydroxyl containing composition. In general, in the preparation of modified polymeric objects it is preferred that the solvent be removed during the later stages of the reaction especially when a completely insoluble product free from solvents is desired. Although it is preferred to carry out the reaction in the absence of substantial quantities of water, the reaction of the N-alkoxymethyl substituted polyamide with the polyhydroxy compound will take place in the presence of water. The solvent or diluent is usually removed by evaporation or distillation from the reaction mixture.

In some cases, especially when an acid catalyst is present, the reaction proceeds at ordinary temperatures (for example, at room temperature) but the time required for reaction at such temperatures may take several days. In most cases it is desirable to bring about the reaction at temperatures of between 80° C. and 250° C. The specific temperature employed is dependent upon the properties of the compositions, for example compositions having low solubility such as cellulose, require higher temperatures for the reaction with the modified polyamide than those in which the compositions are soluble in mutual solvents that are employed. Temperatures of from 250° to 400° C. may be employed in the production of the crosslinked polymeric composition if the time is short (less than a minute). If the temperature remains for a long period substantially in excess of 200° C., some decomposition of the reactants may take place. In general, the temperature and time employed for the reaction are interdependent variables, i. e., a high temperature reduces the time required.

The presence of an acid catalyst such as maleic acid, p-toluene sulfonic acid, phosphoric acid, sodium dihydrogen phosphate, or ther acids which preferably do not bring about substantial decomposition of the polymeric material or substances, or compounds which are acid under suitable reaction conditions, may be employed to bring about the reaction more rapidly and at lower temperatures. In general small amounts (for example, 0.1 to 10% as based on the weight of the modified polyamide) are employed. The conditions for reaction are somewhat dependent upon the presence of hydroxylated plasticizers or of fillers, pigments, etc., which may be incorporated into the reaction mixture to give further modified products.

Because of the improvement resulting from the modification or crosslinking pointed out in the foregoing discussion the improved polymeric materials may be used in a variety of applications. Accordingly the products of this invention may be used in the preparation of fibers, films, coatings, molded articles, etc. It is to be understood that variation of the ratio of the reactants and the degree of crosslinking may give rise to a series of products having slightly different properties which may find specialized applications.

As many apparently widely different embodiments of this invention may be made without departing from the spirit and scope thereof, it is to be understood that the invention is not limited to the specific embodiments thereof except as defined in the appended claims.

I claim:

1. A process which comprises reacting ingredients comprising an N-substituted polyamide and a substance containing a plurality of alcoholic hydroxyl groups by contacting said ingredients at a temperature of at least 20° C. and below the temperature at which decomposition of said ingredients and reaction product takes place, said N-substituted polyamide and substance being present in the proportion of from 1 to 200 parts by weight of said N-substituted polyamide and from 200 to 1 parts by weight of said substance, said N-substituted polyamide being the reaction product of a monohydric alcohol in which the alcoholic hydroxyl is the sole reactive group, formaldehyde and a catalyst consisting of oxygen-containing acid with a synthetic linear polycarbonamide which has hydrogen-bearing amide groups as an integral part of the polymer chain, the average number of carbons in the segments of the chain separating the amide groups being at least 2, and which has a molecular weight of at least 3000, and which consists of the reaction product of bifunctional polyamide-forming material containing complementary amide-forming groups in equimolecular proportions, said N-substituted polyamide containing the groups

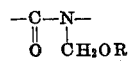

wherein R is the radical of said alcohol, in amount of at least 5% of the carbonamide groups present in said N-substituted polyamide.

2. A process which comprises reacting in the presence of an acid catalyst ingredients comprising an N-substituted polyamide and a substance containing a plurality of alcoholic hydroxyl groups by contacting said ingredients at a temperature of at least 20° C. and below the temperature at which decomposition of said ingredients and reaction product takes place, said N-substituted polyamide and substance being present in the proportion of from 1 to 200 parts by weight of said N-substituted polyamide and from 200 to 1 parts by weight of said substance, said N-substituted polyamide being the reaction product of monohydric alcohol in which the alcoholic hydroxyl is the sole reactive group, formaldehyde and a catalyst consisting of oxygen-containing acid with a synthetic linear polycarbonamide which has hydrogen-bearing amide groups as an integral part of the polymer chain, the average number of carbons in the segments of the chain separating the amide groups being at least 2, and which has a molecular weight of at least 3000, and which consists of the reaction product of bifunctional polyamide-forming material containing complementary amide-forming groups in equimolecular proportions, said N-substituted polyamide containing the groups

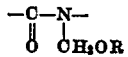

wherein R is the radical of said alcohol, in amount of at least 5% of the carbonamide groups present in said N-substituted polyamide.

3. A process which comprises reacting ingredients comprising N-methoxymethyl polyhexamethylene adipamide and a substance containing a plurality of alcoholic hydroxyl groups by contacting said ingredients at a temperature of at least 20° C. and below the temperature at which decomposition of said ingredients and reaction product takes place, said N-methoxymethyl polyhexamethylene adipamide and substance being present in the proportion of from 1 to 200 parts by weight of said N-methoxymethyl polyhexamethylene adipamide and from 200 to 1 parts by weight of said substance, said N-methoxymethyl polyhexamethylene adipamide being the reaction product of methyl alcohol, formaldehyde, and a catalyst consisting of oxygen-containing acid with polyhexamethylene adipamide having a molecular weight of at least 3000, said N-methoxymethyl polyhexamethylene adipamide containing methoxymethyl groups attached to the nitrogen atom of the carbonamide groups in amount of at least 5% of the carbonamide groups present in said N-methoxymethyl polyhexamethylene adipamide.

4. The process set forth in claim 1, in which said temperature is from 80° C. to 250° C.

5. A composition of matter comprising the product obtained by the process as defined in claim 1.

6. A composition of matter comprising the product obtained by the process defined in claim 3.

BOYNTON GRAHAM.

REFERENCES CITED

The following references are of record in the file of this patent:

UNITED STATES PATENTS

| Number | Name | Date |
| --- | --- | --- |
| 2,108,113 | Eisenmann et al. | Feb. 15, 1938 |
| 2,132,671 | Bauer | Oct. 11, 1938 |
| 2,141,169 | Catlin | Dec. 27, 1938 |
| 2,244,184 | Austin et al. | June 3, 1941 |
| 2,393,972 | Cairns | Feb. 5, 1946 |